Figure 1A:
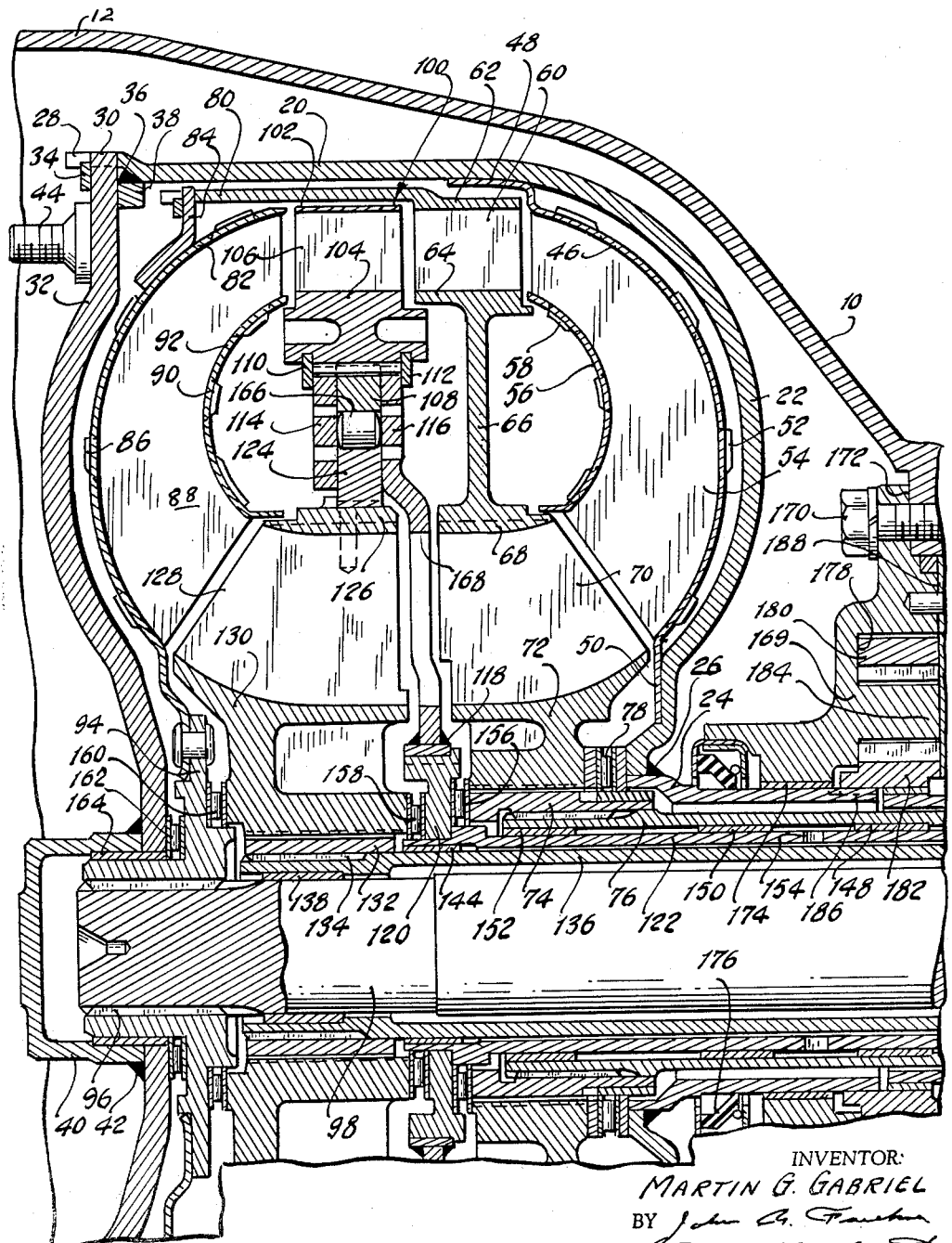

June 8, 1965   M. G. GABRIEL   3,187,512
MULTIPLE ELEMENT HYDROKINETIC TORQUE CONVERTER
Filed May 31, 1963   5 Sheets-Sheet 1

INVENTOR:
MARTIN G. GABRIEL
BY
ATTORNEYS.

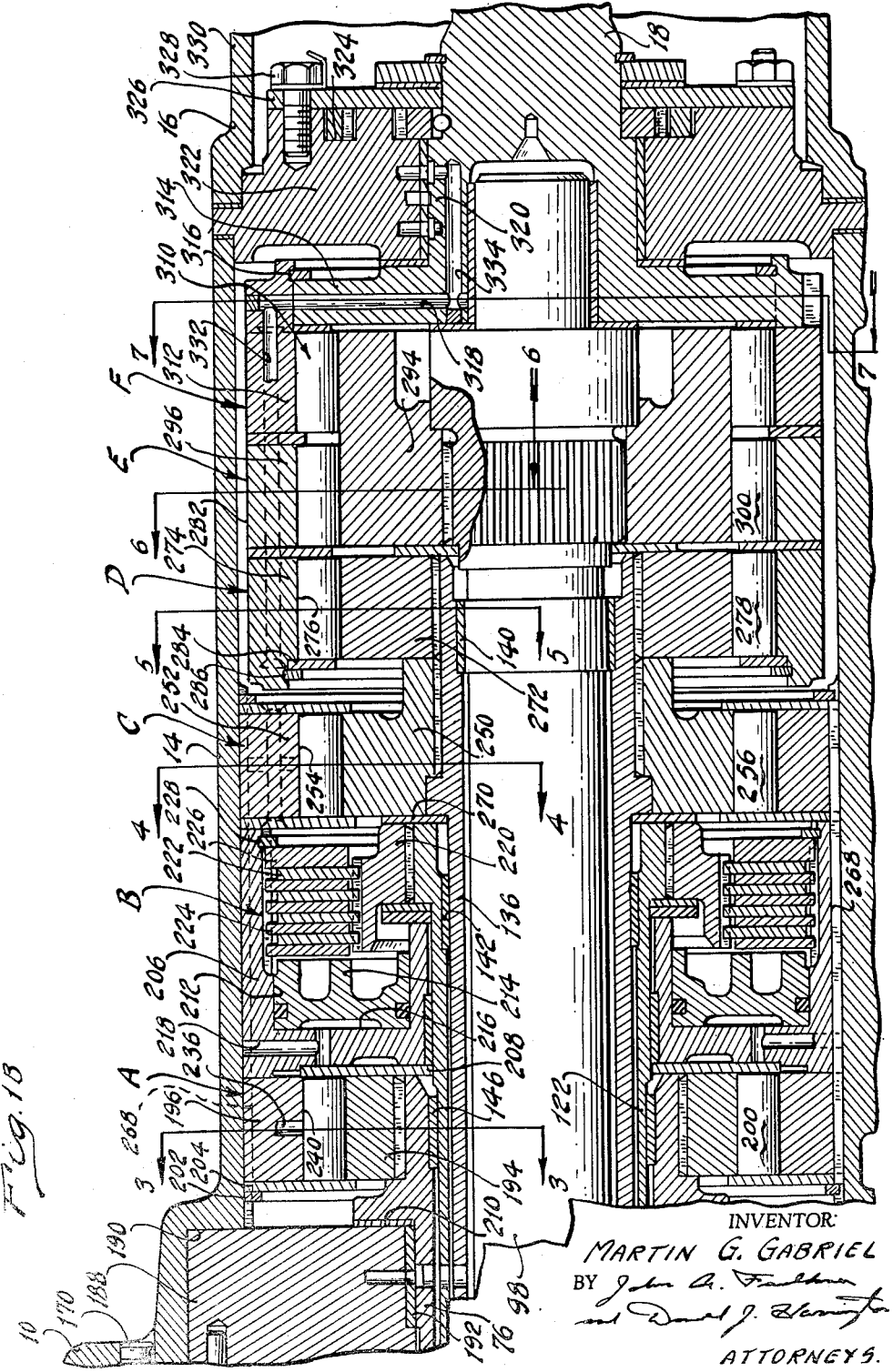

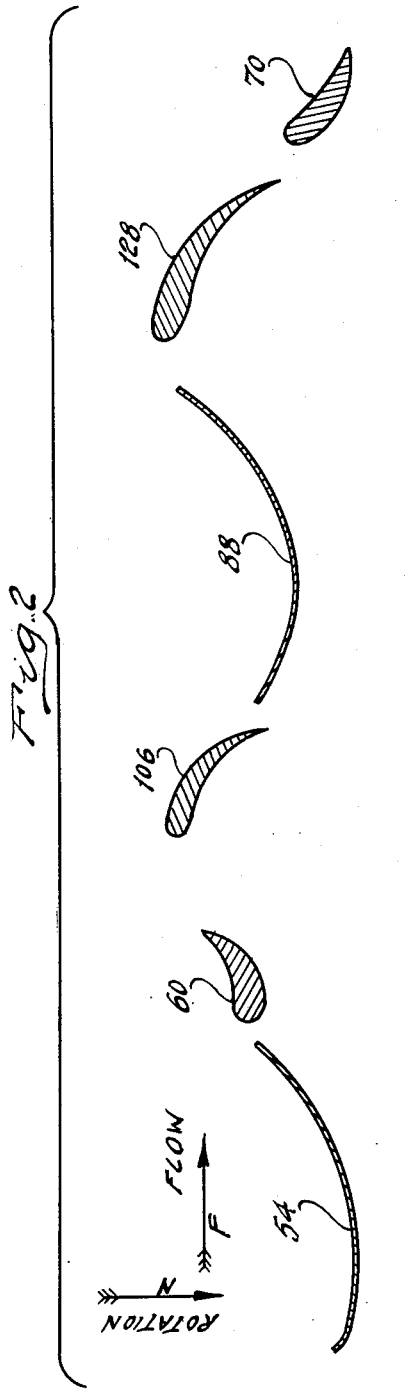

June 8, 1965   M. G. GABRIEL   3,187,512
MULTIPLE ELEMENT HYDROKINETIC TORQUE CONVERTER
Filed May 31, 1963   5 Sheets-Sheet 4
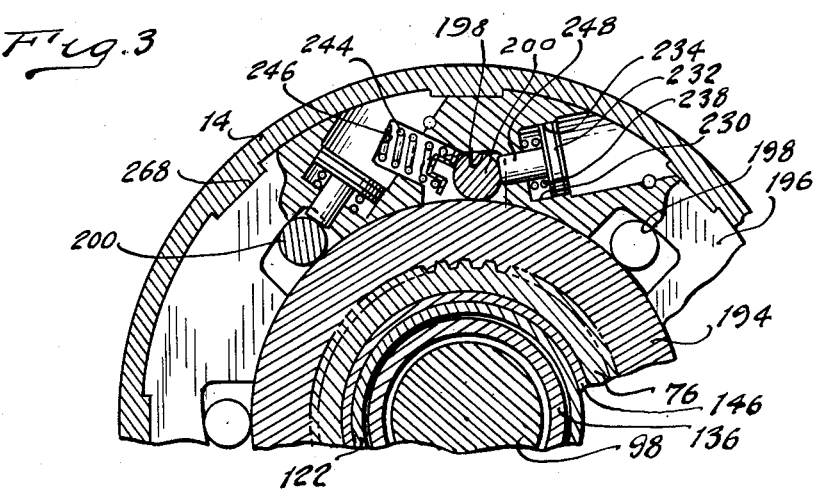
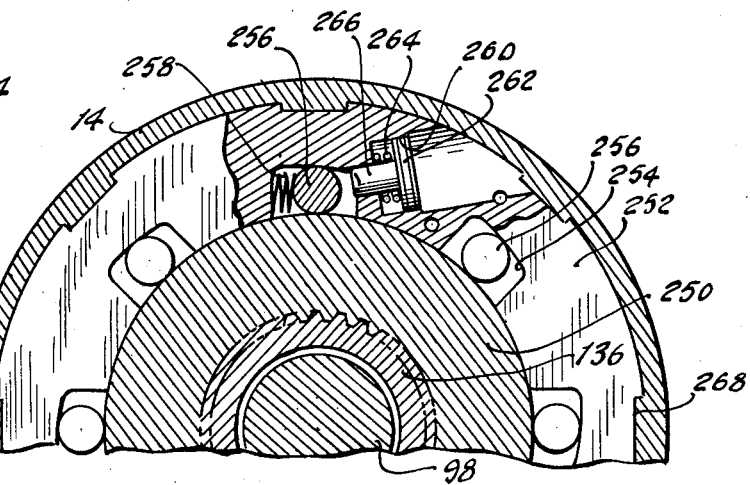
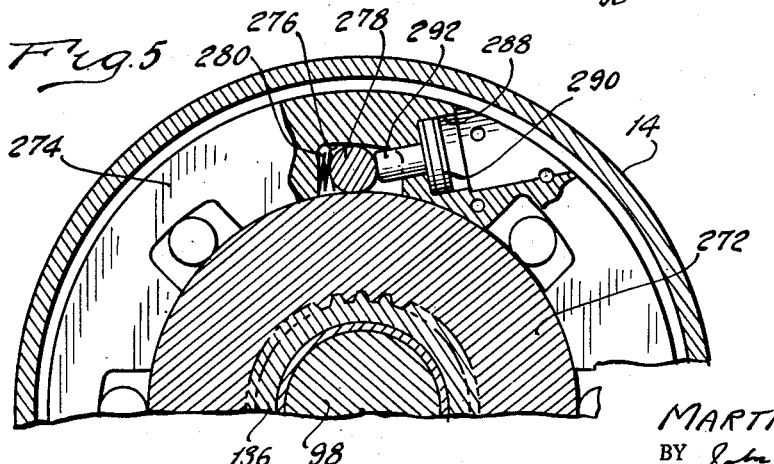
INVENTOR:
MARTIN G. GABRIEL
BY
ATTORNEYS.

June 8, 1965  M. G. GABRIEL  3,187,512
MULTIPLE ELEMENT HYDROKINETIC TORQUE CONVERTER
Filed May 31, 1963  5 Sheets-Sheet 5

INVENTOR:
MARTIN G. GABRIEL
BY
ATTORNEYS.

United States Patent Office 3,187,512
Patented June 8, 1965

3,187,512
MULTIPLE ELEMENT HYDROKINETIC TORQUE
CONVERTER
Martin G. Gabriel, Dearborn, Mich., assignor to Ford
Motor Company, Dearborn, Mich., a corporation of
Delaware
Filed May 31, 1963, Ser. No. 284,410
8 Claims. (Cl. 60—54)

My invention relates generally to power transmission mechanisms, and more particularly to improvements in hydrokinetic torque converter mechanisms.

In a preferred form of my invention I have provided a multiple element hydrokinetic torque converter having a compound turbine and a dual stator assembly. Provision is made for drivably coupling the compound turbine to a driven member through selectively engagable clutch structure during forward drive operation. Provision is made also for clutching together the driven member and the stator assembly and for braking the turbine during reverse drive operation. This clutch and brake arrangement makes its unnecessary to provide a separate reverse drive gear system for obtaining reverse drive.

Hill braking is accomplished by providing a new and improved means for anchoring the stator assembly to a stationary housing portion of the mechanism in those instances when the turbine overruns the impeller member of the hydrokinetic torque converter.

I contemplate that the stator assembly will comprise two bladed portions, one bladed portion being disposed at a radially outward region of the torus flow circuit of the converter. The radially outward portion is capable of free-wheeling with respect to the other portion, which is mounted at a radially inward region of the circuit. The inward stator portion, however, also is capable of free-wheeling but at a different clutch point than the corresponding clutch point for the radially outward stator portion. During coasting or hill braking operation, reverse free-wheeling of the stator portions is prevented and a considerable augmentation in the degree of braking torque then is realized.

The provision of a hydrokinetic torque converter mechanism of the type above set forth being a principal object of my invention, it is a further object of my invention to provide a torque converter power transmission mechanism having an extended torque multiplication ratio range. Unlike conventional hydrokinetic mechanisms, my improved construction does not require the use of torque multiplying gear elements to obtain the necessary overall torque ratio for the extended torque multiplication range.

It is a further object of my invention to provide a hydrokinetic torque converter mechanism of the type above set forth wherein provision is made for obtaining an augmented degree of coast braking.

It is a further object of my invention to provide a torque converter mechanism as set forth above wherein the motion of the elements of the converter, the driven element and the reaction element can be controlled during operation by fluid pressure operated clutches and brakes.

It is a further object of my invention to provide a mechanism of the type above set forth and which may be adapted readily for use in contemporary automotive vehicle drive lines. I contemplate further that a substantial number of components of my improved mechanism will be interchangeable with corresponding components of conventional power transmission mechanisms that are used in the automotive vehicle industry.

Figure 6:
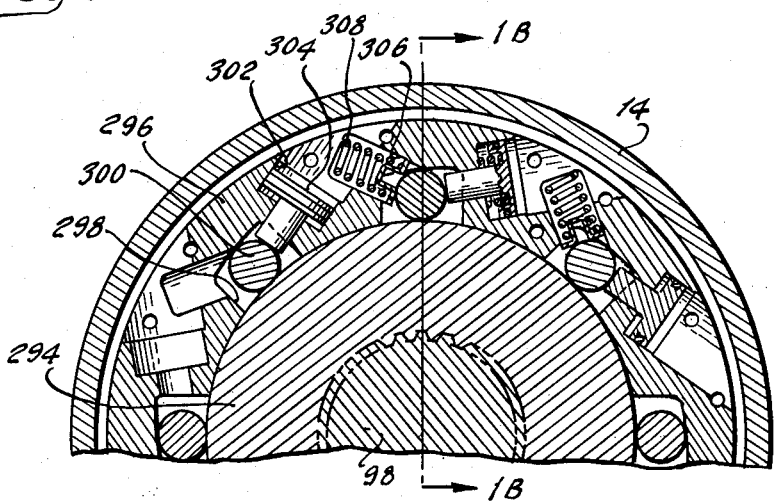
Figure 7:
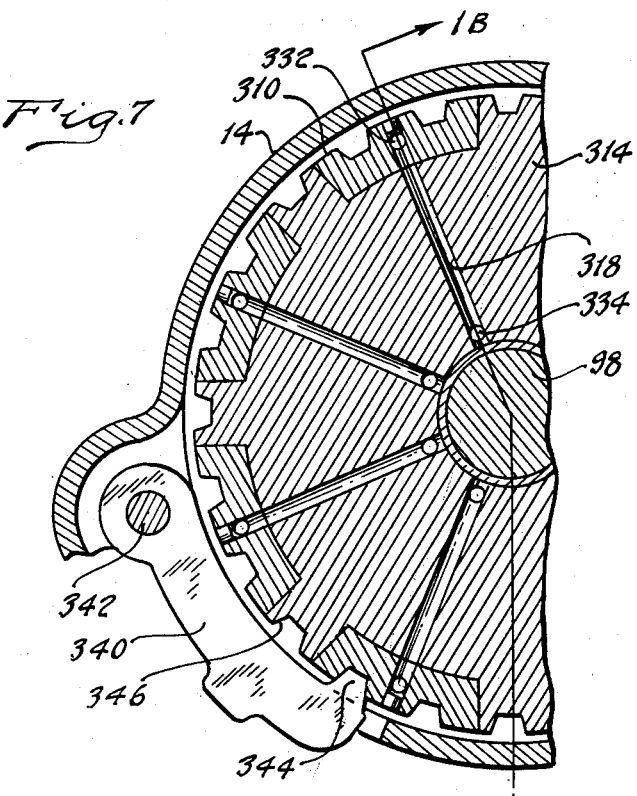

For the purpose of describing more particularly the features of my invention, reference will be made to the accompanying drawings wherein:

FIGURES 1A and 1B show a longitudinal cross sectional view of my mechanism;
FIGURE 2 is a schematic representation of the torque converter blades;
FIGURE 3 is a transverse cross sectional view taken along section line 3—3 of FIGURE 1B;
FIGURE 4 is a transverse cross sectional view taken along section line 4—4 of FIGURE 1B;
FIGURE 4 is a transverse cross sectional view taken along section 5—5 of FIGURE 1B;
FIGURE 6 is a transverse cross sectional view taken along section line 6—6 of FIGURE 1B;
FIGURE 7 is a transverse cross sectional view taken along section line 7—7 of FIGURE 1B; and
FIGURE 8 is a chart showing the clutch and brake engagement and release pattern for the mechanism of FIGURES 1A and 1B.

Referring first to FIGURES 1A and 1B, numeral 10 designates generally a torque converter bell housing that may be connected at its radially outward periphery 12 to an engine block for an internal combustion vehicle engine. Bell housing 10 is formed integrally with a main housing 14, which contains the clutch and brake structure of my mechanism. Connected to the right hand end of housing 14 is a tailshaft housing 16 that encloses a driven tailshaft 18.

Situated within the bell housing 10 is a torque converter impeller shell 20 having a bell shaped intermediate portion 22 and a hub sleeve shaft 24. Shaft 24 can be welded at 26 to the inner peripheral margin of shell 20.

The outer peripheral margin of shell 20 is formed with offset extensions 28 between wihch are disposed radially outward projections 30 carried by the periphery of a drive plate 32. A snap ring 34 holds the housing 20 axially fast with respect to the drive plate 32. A seal 36 can be situated at the juncture of the periphery of drive plate 32 within the shell 20. A seal supporting pilot shoulder is provided as shown at 38.

The hub of drive plate 32 is connected to an extension 40 by weld metal 42. This extension 40 provides a pilot which may be received within a corresponding opening formed in the end of the crankshaft for the vehicle engine. The crankshaft, not shown, can be connected drivably to the plate 32 by means of a flexible drive disc, the periphery of which may be bolted to the periphery of plate 32 by means of threaded studs 44.

Secured to the inner surface of the shell 20 is an outer pump shroud 46 that is welded at its outer margin 48 to the inner surface of the shell 20. It is welded also at its inner margin 50 to a radially inward portion of the inner surface of shell 20.

Shroud 46 is provided with slots through which tabs 52 for impeller blades 54 are located. These blades 54 are situated within the shroud 46 to define radial fluid flow passages in the usual fashion. The inner margins of the blades 54 are secured to an inner shroud 56 which may be apertured to receive tabs 58.

A first bladed turbine element is situated adjacent the radially outward flow exit section of the impeller. This turbine element comprises circumferentially spaced blades 60 situated between an outer shroud 62 and an inner shroud 64. Shroud 64 is connected to a turbine torque transfer element 66 which in turn is connected by means of a slot and key connection 68 to the outer peripheries of turbine blade elements 70. These elements 70 are situated adjacent the flow entrance region of the impeller and are carried by the hub 72 which functions also as one of the turbine shrouds.

Hub 72 is internally splined to receive an externally splined element 74 which in turn is splined to a sleeve shaft 76. A thrust washer 78 is disposed between hub 72 and the hub portion of impeller shell 20.

Outer turbine blade shroud 62 is connected to a turbine torque transfer member 80 which in turn is keyed in positive driving relationship to an outer turbine blade shroud 82 for a secondary turbine. The keyed connection includes elements 84 which are connected to the shroud 82 by welding.

Shroud 82 is formed with a plurality of slotted openings through which tabs 86 are situated. These tabs are formed on the outer margins of the turbine blades 88. The inner margins of these blades 88 are formed with tabs 90 that are received within cooperating openings formed in an inner turbine shroud 92.

The hub 94 of the secondary turbine shroud 82 is internally splined at 96 to a turbine shaft 98, the latter extending axially through the mechanism.

Disposed between the exit section of the primary turbine and the entrance section of the secondary turbine is a primary bladed stator generally indicated by reference character 100. It includes a first shroud 102 and a second shroud 104. Disposed between the shrouds 102 and 104 is a series of circumferentially spaced stator blades 106.

The interior of shroud 104 is splined or keyed to an outer brake race 108. This race is held axially fast within the shroud 104 by a pair of snap rings 110 and 112. A retainer 114 is situated between snap ring 110 and the race 108. A stator element 116 is situated between race 108 and snap ring 112.

Stator element 116 extends radially inwardly through the inner torus region adjacent the entrance section of turbine blade elements 70. It is welded at 118 to a hub 120 which in turn is secured to sleeve shaft 122 that is concentrically disposed within sleeve shaft 76.

An inner brake race is shown at 124. It is disposed between elements 114 and 116 and is internally splined to an externally splined turbine reactor shroud 126. This shroud is situated about the blades 128 of a secondary stator. A stator hub 130 may be joined integrally to the blades 128 and keyed or splined to an adaptor 132 which is splined at 134 to a stator sleeve shaft 136. The turbine shaft 98 is received concentrically within the shaft 136 as indicated.

A bushing 138 is situated between sleeve shaft 136 and shaft 98 to provide bearing support. Another bushing 140 is situated at the right hand end of sleeve shaft 136.

A pair of bushings 142 and 144 is situated between sleeve shafts 136 and 122 to provide needed support.

Bushings 146, 148, 150 and 152 are situated between sleeve shafts 122 and 76.

Sleeve shaft 122 is formed in two parts, one of which is connected to the hub 120 as indicated and the other of which extends to the brake structure B. The two parts of the sleeve shaft 122 are joined together by means of a dog clutch comprising interlocking portions 154.

A thrust washer 156 is situated between adaptor 74 and the hub 120 of the stator element 116.

A similar thrust washer 158 is disposed between the hub 120 and the hub 130. Thrust washers 160 and 162 are situated between hub 94 and hub 130 and between hub 94 and the plate 32, respectively.

Hub 94 is journalled within the extension 40 by means of a bushing 164.

The relative geometry of the blading for the pump, the turbine and the reactor elements of the converter is illustrated in FIGURE 2. Each of the bladed elements of the turbine contributes to the turbine torque that is delivered to shaft 98. The blade elements of FIGURE 2 are shown in schematic form in an unwrapped condition. The direction of the rotational vector components of the fluid flow in the torus circuit is represented in FIGURE 2 by the arrow N. The direction of the toroidal fluid flow vector is represented by the arrow F. The absolute fluid flow velocity vector at any station therefore will be equal to the vector sum of the blade angles, the vector in direction N and the vector in direction F. The change in the tangential component of the absolute fluid flow velocity vector and the change in the operating radii, as the fluid traverses the torus circuit, is a measure of the change in the moment of momentum of the fluid.

Under starting conditions while the converter mechanism operates at a reduced speed ratio, both stator elements are effective to change the direction of the torus flow to provide torque augmentation. When a relatively reduced speed ratio is achieved, however, the coupling point for the bladed stator 100 is reached. Overrunning brake, shown in part at 108 and 124, then will permit free-wheeling of the stator 100 in a reverse direction. During operation in lower speed ratios, however, roller elements 166 situated between the races 108 and 124 will inhibit rotation of the stator 100. Rollers 166 cooperate with cammed surfaces formed on one or the other of the races 108 and 124.

In one operating embodiment the free-wheeling of the first stator may occur at about .5 speed ratio.

When the speed ratio reaches a value of approximately .85, the secondary stator free-wheels. During operation in the torque conversion range, however, motion of the secondary stator is inhibited to provide torque augmentation.

The stator element 116 is apertured, as shown at 168, to accommodate free toroidal fluid circulation in the torus circuit of the converter.

A wall 169 is secured by bolts 170 to a shoulder 172 formed in the bell housing 10. This wall 169 supports sleeve shaft 24 by means of a bushing 174. A fluid seal 176 is provided as indicated.

Wall 169 defines a pump chamber 178 within which are situated pumping elements 180 and 182. These elements are disposed in geared relationship in a conventional fashion with a crescent 184 between them. Sleeve shaft 24 is keyed at 186 to the gear element 182.

A fluid pressure distributor body 188 is supported within a shoulder 190 formed in housing 14. The sleeve shaft 76 is journalled in a bushing 92 within the body 188. Shaft 76 is splined to a brake race 194 which in turn is journalled in an outer brake race 196. Race 196 has formed therein recesses 198 within which are situated rollers 200. These recess 198 define cam surfaces which cooperate with the rollers 200 to establish braking action between the races. Race 196 is externally splined to an internally splined portion of the housing 14.

Axial movement of the races 196 and 194 in a left hand direction is inhibited by a snap ring 202. A spacer plate 204 is situated between snap ring 202 and races 194 and 196.

A disc brake element 206 is externally splined to an internally splined portion of housing 14. It is situated adjacent race 196. A thrust washer 208 is situtated between element 206 and the inner race 194. Another thrust washer 210 is disposed between race 194 and the body 188.

Element 206 defines an annular cylinder 212 within which is disposed an annular piston 214. Cylinder 212 and piston 214 cooperate to define a pressure cavity 216. Fluid pressure may be distributed to this cavity 216 through a feed passage 218 formed in element 206.

A brake hub 220 is splined to sleeve shaft 122. It is formed with external splines to facilitate a driving connection with internally splined brake discs 222. These discs are situated in interdigital relationship with respect to externally splined discs 224 which are carried by an internally splined portion of the element 206. A reaction disc 226 also is carried by the internally splined portion of element 206 and is held axially fast by snap ring 228.

When fluid pressure is admitted to the chamber 216, the brake discs are urged into frictional engagement thereby anchoring sleeve shaft 122 and the stator element 116 to inhibit rotation of the latter in either direction.

Referring particularly to FIGURE 3, race 196 has formed therein a plurality of cylinders 230, each of which receives a piston 232. Each piston 232 and cooperating cylinder 230 define a pressure cavity 234 that communicates with a supply pressure source through a passage 236. This passage may form a part of an automatic control system, not shown.

Piston 232 is urged in a clockwise direction, as viewed in FIGURE 3, by a piston return spring 238.

The rollers 200 normally are urged out of camming engagement with respect to the cam surfaces defined by the recesses. Release springs 244, which are situated within openings 246 formed in race 196, are provided for this purpose.

Piston 232 is formed with an extension 248 which engages the rollers 200 thereby causing the rollers to assume a locking position against the opposing influence of springs 244 when the cavity 234 is pressurized. This inhibits counter-clockwise rotation of race 194 and sleeve shaft 76 as viewed in FIGURE 3.

An inner overrunning brake race 250 is splined at 252 to shaft 136. Disposed about race 250 is an outer race 252, one race being piloted with respect to the other. Race 252 is formed with a plurality of cam recesses 254 which define cam surfaces. Rollers 256 are disposed within the recesses 254. These rollers are urged into a camming relationship with respect to the races by means of individual roller springs 258. Race 252 is formed with a plurality of cylinders 260 within which are positioned pistons 262. These pistons are urged in a clockwise direction, as viewed in FIGURE 4, by return spring 264.

Piston 262 and recess 260 define a pressure cavity. Piston 262 also is formed with an extension 266 which engages rollers 256 when the pressure cavity behind piston 262 is pressurized. Rollers 256 normally assume a locking position however.

Outer race 252 is keyed or splined to the transmission housing 14 as indicated at 268.

A thrust washer 270 is situated between the hub 220 of the friction disc brake and the inner race 250. The other side of the race 250 is engaged by another releasable roller brake race 272. This race also is splined to the sleeve shaft 136.

Piloted upon race 272 is an outer race 274 which is formed with a plurality of recesses 276. A roller 278 is situated within each recess and is urged by means of spring 280 into a camming position. A plurality of rollers 278 and cooperating recesses are provided.

Race 274 forms a part of a clutch drum 282. Rollers 278 are held axially fast by a retainer ring 284 that is held in place by a snap ring 286.

Race 274 is formed with a plurality of cylinders 288 within which are disposed pressure operated pistons 290. These have formed thereon an extension 292. Each extension 292 is adapted to engage one of the rollers 278 and disengage the same when pressure is admitted to the cylinder 288 in back of the respective pistons 290.

Splined to the right hand end of shaft 98 is another inner clutch race 294. Piloted upon race 294 is an outer race 296 which is formed with a plurality of cam recesses 298. A clutch roller 300 is situated within each recess 298. Formed also in race 296 is a plurality of cylinders 302 within which are positioned pistons 304. Each piston 304 and each cylinder 302 cooperate to define a pressure cavity which may be pressurized to cause rollers 300 to move into camming engagement with the associated cam surfaces of recesses 298. Spring openings 306 are situated in race 296 and receive springs 308. The springs urge rollers 300 in a clockwise direction, as viewed in FIGURE 6, out of camming engagement with their associated cam surfaces.

Inner race 294 also cooperates with another roller clutch that is indicated generally by reference character 310, in FIGURE 1B. This roller clutch may be substantially identical to the roller clutch construction shown in FIGURE 5. It will not be necessary, therefore, to repeat the description of clutch 310. It includes, however, an outer clutch race 312 that is formed with clutch recesses which receive rollers. These rollers may be urged out of camming engagement by fluid pressure operated pistons and are normally urged into camming engagement by means of an associated clutch spring. Race 312, like races 296 and 274, define a portion of drum 282.

Drum 282 is carried by a radial drive plate 314. This plate may be held axially fast to the drum 282 by a snap ring 316.

Plate 314 is formed with radial pressure distributor passages 318 which communicate with the pressure distributor manifold 320 journalled within an end wall 322. This wall defines also a pump cavity 324 within is situated a positive displacement gear pump as shown. A cover plate 326 is bolted by bolts 328 to the wall 322. This wall in turn is secured at its periphery to the right hand end of housing 14.

A tailshaft extension housing 330 is bolted or otherwise secured to the wall 322 and encloses the driven shaft 18.

Passages 318 communicate with longitudinally extending passages 322 formed in the outer races 274, 296 and 312. These passages 332 communicate with the clutch pressure chambers described with reference to FIGS. 5 and 6 as well as the pressure chamber associated with clutch 310. Fluid pressure is supplied to the passages 318 through longitudinally extending passages formed in shaft 18, one of which is shown at 334. Passages 334 in turn communicate with registering pressure grooves and the passages formed in wall 322. These passages may form a part of the automatic control valve system referred to previously. This valve system may comprise a valve body that may be located within the transmission sump that is defined in part by an oil pan which is bolted to the lower portion of the transmission housing 14.

As best seen in FIGURE 7, a parking pawl 340 can be pivoted upon a pivot shaft 342 carried by the transmission housing 314. The pawl includes a tooth 344 that is adapted to register with teeth 346 carried by the drum 282. A suitable pawl actuator, not shown, can be provided for moving the pawl 340 into and out of registery with the teeth 346. This causes the drum 282 to be anchored selectively. Power output shaft 18, which is connected to the plate 314, then is held stationary in this fashion.

The torque that is developed by the hydrokinetic unit is distributed to the central turbine shaft 98 by each of the three turbine sections. By employing an arrangement of this type, it is possible to establish a size factor relationship that will be characterized by a relatively rapidly increasing engine speed as the converter speed ratio increases. For the purpose of this description, the size factor can be defined as the impeller speed for any given speed ratio divided by the square root of the engine torque delivered to the impeller.

After a predetermined speed ratio has been achieved, the fluid flow velocity vector at the exit section of the first turbine section 60 will establish a tangential fluid flow component that will tend to cause the first stator section 100 to free-wheel with respect to the second stator blades 128. Overrunning brake elements 166 will permit this free-wheeling to take place. Until this initial clutch point is reached, however, the stator 100 augments the moment of momentum of the fluid that passes through it before it enters the entrance section of the turbine blades 88.

Upon a further increase in the speed ratio in the hydrokinetic torque converter unit, the second stator will free-wheel after a second clutch point is reached. The rollers 256 shown in FIGURE 4 permit this free-wheeling motion to take place Prior to the time that this clutch point is reached, however, the rollers 256 establish a torque reaction delivery path between the compound stator and the housing 14.

By referring to FIGURE 8, the pattern of operation of various clutches and brakes of the mechanism of FIGURES 1A and 1B can be understood. For purposes of clarity, various clutches and brakes have been identified by the symbols A, B, C, D, E, and F. Corresponding symbols identify clutches and brakes in FIGURE 1B.

During normal operation in the drive range, rollers 200 in FIGURE 3 are released. At this time, pressure behind the pistons 232 is exhausted. The compound turbine and the turbine shaft 76 thus are capable of moving freely in a clockwise direction as viewed in FIGURE 3. Similarly, the friction brake is released by exhausting the annular cylinder 216.

Brake rollers 256 are urged under driving conditions into locking engagement as illustrated in FIGURE 8. It therefore is adapted to accommodate the reaction torque of the compound stator. The pressure in the cylinders 260 under there conditions is exhausted. The rollers 278 in FIGURE 5 assume a free-wheeling condition as cylinders 288 are pressurized. Rollers 300 shown in FIGURE 6 assume a locked condition as cylinders 302 are pressurized to oppose the release springs 308. The roller clutch 310 free-wheels.

The freed condition of rollers 278, the locked condition of rollers 300 and the free-wheeling condition of the clutch 310 are established by controlling pressure distributed to their respective pressure chambers through the feed passages 318.

To establish reverse drive operation, brake A is locked, brake B is freed and brake C is freed. Pressure distribution in passages 318 is controlled to cause the clutch D to become locked and the clutch E to become freed.

Clutch 310, however, is incapable of delivering torque since the inner race 294 is driven during reverse drive operation in a direction which will permit the clutch to run freely.

During hill brake operation, brake A is free, brake B is locked and brake C free-wheels. Clutch D is freed and clutches E and F are locked. It will be apparent, therefore, that the sleeve shaft 122 will become anchored to the housing 14. This, of course, causes the stator section 106 to become anchored. The hill braking characteristics of the converter unit when the compound turbine overruns the impeller thus are greatly improved.

Under hill braking conditions, shaft 18 drives the drum 282 through the locked clutch F. The torque is then delivered to the turbine shaft 98 through clutch F. Torque is delivered also through the locked clutch E and through the turbine shaft 98 from the shaft 18.

The compound stator, since it offers a hydrokinetic resistance to the torus flow under these hill braking conditions will cause a portion of the effective hill braking torque to be delivered to the housing and the balance will be delivered to the engine in the usual fashion by reason of the hydrokinetic reaction provided by the impeller.

During hill braking, the brake rollers 166 for the compound stator also will inhibit rotation of the stator section 128. This further augments the hill braking capacity.

As previously explained, the compound turbine is anchored to the housing 14 during reverse drive operation by means of brake A. A reverse torque will then be delivered to the stator in the usual fashion. But since brake C is released, the compound stator is permitted to rotate in a reverse direction. This reverse rotation is transmitted through the locked clutch D thereby causing the drum 282 and the power output shaft 18 to be driven in a reverse direction.

To establish a neutral condition, the clutches and brakes assume the condition indicated in FIGURE 8.

Having thus described a preferred embodiment of my invention, what I claim and desire to secure by United States Letters Patent is:

1. A power transmission mechanism comprising a hydrokinetic torque converter, said converter including an impeller, a stator and a turbine assembly situated in toroidal fluid flow relationship, said impeller being connected to a driving member, said turbine assembly being connected to a driven member, said stator having a first bladed section located at a radially outward region and a second bladed section located at a radially inward region, a one-way brake between said stator sections, means for anchoring said stator including a stator shaft and an overrunning brake for transferring stator torque reaction to a relatively stationary portion of said mechanism, a second stator shaft connected to said first stator section, and means for braking selectively said second stator shaft to a relatively stationary portion of said mechanism thereby inhibiting free wheeling of said first stator section when said turbine assembly overruns said impeller.

2. A hydrokinetic torque converter transmission mechanism for transferring driving torque from a driving member to a driven member, said mechanism including an impeller, a stator and multiple turbines disposed in toroidal fluid flow relationship in a common torus circuit, said stator comprising a first section situated in a radially outward region of said circuit and a second stator section situated at a radially inward region of said circuit, means for transferring the negative torque reaction of said stator sections to a stationary portion of said mechanism including an overrunning brake and a first stator shaft, a second stator shaft connected to first stator section, and brake means for selectively anchoring said second stator shaft to said stationary portion to prevent free-wheeling motion of said stator section when said turbine overruns said impeller.

3. A power transmission mechanism for transferring power from a driving member to a driven member, a torque converter unit comprising an impeller, a first stator, a turbine and a second stator situated in toroidal fluid flow relationship in a common torus circuit, said first stator being situated in a radially outward region of said circuit, means for establishing a one-way connection between said stators, means for transferring the negative torque reaction of said stators to said housing including a first stator shaft and an overrunning brake, means for connecting said turbine to said driven member, a second stator shaft connected to said first stator, and selectively operable brake means for anchoring said second stator shaft to augment the hydrokinetic braking action of said mechanism.

4. A power transmission mechanism for transferring power from a driving member to a driven member comprising a hydrokinetic impeller, a first turbine, a first stator, a second turbine, a second stator and a third turbine situated in toroidal fluid flow relationship within a common torus circuit, said driving member being connected to said impeller, said turbines being connected together to form a compound turbine assembly, means for connecting said turbine assembly to said driven member, overrunning brake means for connecting said first stator to said second stator thereby defining a compound stator assembly, means for transferring reaction torque of said stator assembly to a stationary portion of said mechanism including a first stator shaft and an overrunning brake, a second stator shaft connected to said first stator, and means for anchoring selectively said second stator shaft to said stationary portion of said mechanism to augment the hydrokinetic braking action of said mechanism.

5. A power transmission mechanism comprising a hydrokinetic torque converter, said converter including an impeller, a stator and a turbine situated in toroidal fluid flow relationship, said impeller being connected to a driving member, means for connecting said turbine to a driven member, means for anchoring said stator including a stator shaft and an overrunnnig brake for transferring stator torque reaction to a relatively stationary portion of said mechanism, a second stator shaft connected to said stator, and means for braking selectively said second stator shaft to a relatively stationary portion of said mechanism thereby inhibiting free-wheeling of said stator when said turbine overruns said impeller, a turbine sleeve shaft surrounding said driven member and connected to said turbine, means for selectively releasing the overrunning brake for said stator, means for anchoring selectively said turbine sleeve shaft to establish reverse drive operation when said overrunning brake is released, and means for connecting said first stator shaft to said driven member during reverse drive operation.

6. A hydrokinetic torque converter transmission mechanism for transferring driving torque from a driving member to a driven member, said mechanism including an impeller, a stator and a turbine disposed in toroidal fluid flow relationship in a common torus circuit, said stator comprising a first section situated in a radially outward region of said circuit, means for transferring negative torque reaction of said stator to a stationary portion of said mechanism including an overrunning brake and a first stator shaft, a second stator shaft connected to said stator, brake means for selectively anchoring said second stator shaft to said stationary portion thereby inhibiting free-wheeling motion of said stator when said turbine overruns said impeller, a turbine sleeve shaft connected to said turbine, means for selectively releasing the overrunning brake for said stator, means for anchoring selectively said turbine sleeve shaft to establish reverse drive operation when said overrunning brake is released, and means for connecting said first stator shaft to said driven member during reverse drive operation.

7. A power transmission mechanism for transferring power from a driving member to a driven member, a torque converter unit comprising an impeller, a first stator, a turbine and a second stator situated in toroidal fluid flow relationship in a common torus circuit, said first stator being situated in a radially outward region of said circuit, brake means for establishing a one-way connection between said stators, means for transferring negative torque reaction of said stators to said housing including a first stator shaft and an overrunning brake, means for connecting said turbine to said driven member including a first turbine shaft, a second stator shaft being connected to said first stator, selectively operable brake means for anchoring said second stator shaft to augment the hydrokinetic braking action of said mechanism, a turbine sleeve shaft surrounding said first turbine shaft and connected to said turbine, means for selectively releasing the overrunning brake for said stator, means for anchoring selectively said turbine sleeve shaft to establish reverse drive operation when said overrunning coupling is released, and means for connecting said first stator shaft to said driven member during reverse drive operation.

8. A power transmission mechanism for transferring power from a driving member to a driven member comprising a hydrokinetic impeller, a first turbine, a first stator, a second turbine, a second stator and a third turbine situated in toroidal fluid flow relationship in a common torus circuit, said driving member being connected to said impeller, said turbines being connected together to form a compound turbine assembly, said turbine assembly being connected to said driven member, first overrunning brake means for connecting said first stator to said second stator thereby defining a compound stator assembly, means for transferring reaction torque of said stator assembly to a stationary portion of said mechanism including a first stator shaft and a second overrunning brake, a second stator shaft connected to said first stator, brake means for anchoring selectively said second stator shaft to said stationary portion of said mechanism to augment the hydrokinetic braking action of said mechanism, a turbine sleeve shaft connected to said turbines, means for selectively releasing said second overrunning brake, brake means for anchoring selectively said turbine sleeve shaft to establish reverse drive operation when said second overrunning brake is released, and clutch means for connecting said first stator shaft to said driven member during reverse drive operation.

References Cited by the Examiner
UNITED STATES PATENTS

| | | | |
|---|---|---|---|
| 2,042,189 | 5/36 | Rabe | 60—54 |
| 2,772,538 | 12/56 | Ullery | 60—54 |
| 2,873,618 | 2/59 | De Lorean | 74—732 |

DAVID J. WILLIAMOWSKY, *Primary Examiner.*